No. 712,494. Patented Nov. 4, 1902.
A. E. BUTLER.
FISHING NET.
(Application filed Apr. 30, 1902.)
(No Model.)
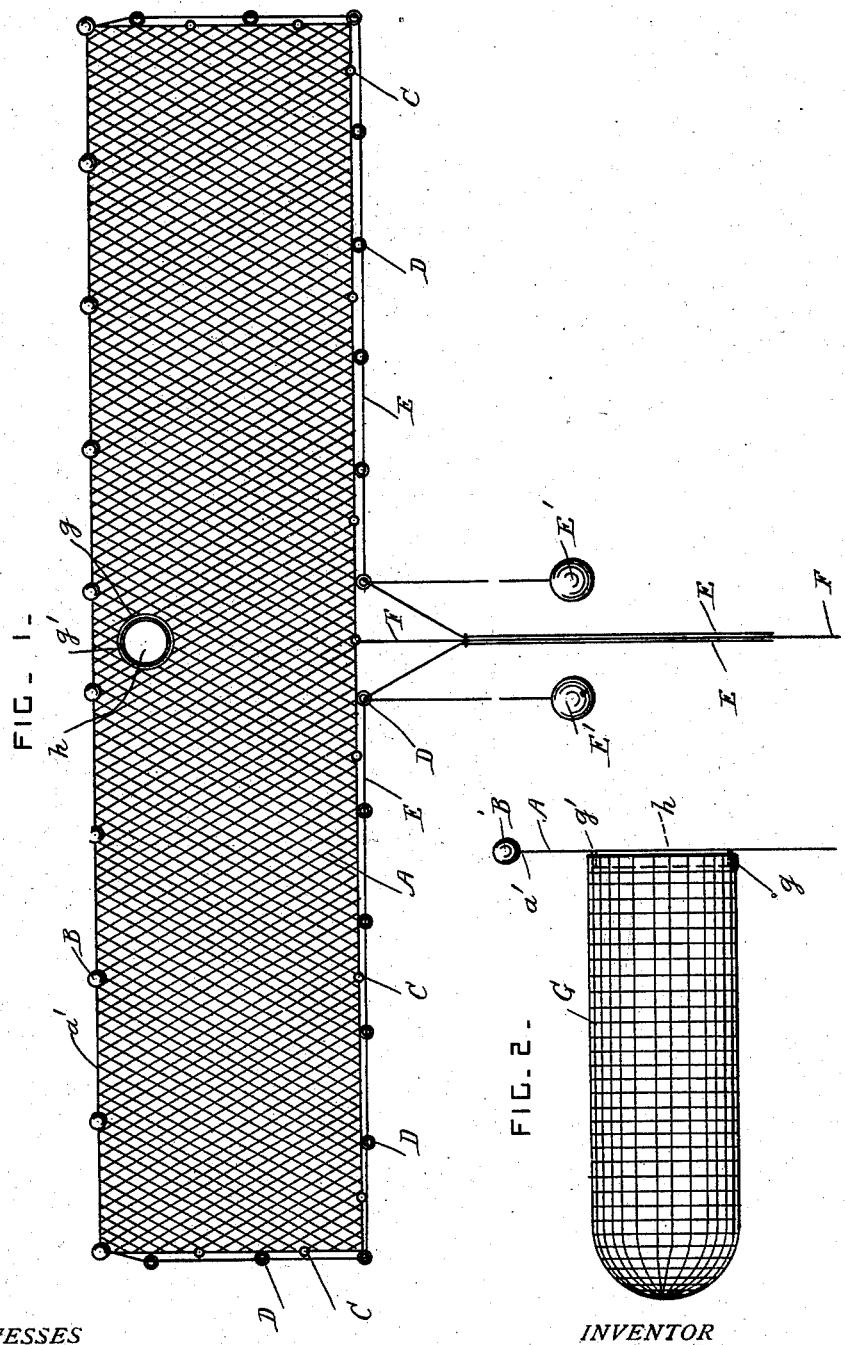
WITNESSES
INVENTOR
Albert E. Butler
by Herbert W. T. Jenner
Attorney

UNITED STATES PATENT OFFICE.

ALBERT E. BUTLER, OF GLOUCESTER, MASSACHUSETTS.

FISHING-NET.

SPECIFICATION forming part of Letters Patent No. 712,494, dated November 4, 1902.

Application filed April 30, 1902. Serial No. 105,336. (No model.)

*To all whom it may concern:*

Be it known that I, ALBERT E. BUTLER, residing at Gloucester, in the county of Essex and State of Massachusetts, have invented certain new and useful Improvements in Fishing-Nets; and I do hereby declare the following to be a full, clear, and exact description of the invention, such as will enable others skilled in the art to which it appertains to make and use the same.

This invention relates to seine-nets; and it consists in the novel construction and combination of the parts hereinafter fully described and claimed.

In the drawings, Figure 1 is a plan view showing the net spread out flat. Fig. 2 is a detail side view of the trap.

A is the net, which is a long strip of netting of any approved dimensions and mesh, such as used in seine-fishing.

B represents floats secured along the top edge $a'$ of the net, and C represents sinkers secured along its bottom edge and sides.

D represents guide-rings secured at intervals along the bottom edge and sides of the net.

E represents the two main purse-lines, which are secured at one end to the two top corners of the net and which pass through the guide-rings in opposite directions to points near the middle of the bottom edge of the net.

E' represents the purse-weights.

F is an auxiliary purse-line, which is secured to the middle portion of the bottom edge of the net. The other ends of the three purse-lines are all secured together.

G is a bag or trap secured to the middle of the top portion of the net. The trap G has a ring $g$, which is secured to a ring $g'$. The ring $g'$ is secured around a hole or opening $h$ in the net. The trap may be separated from the net, and more than one trap may be used, if desired.

The net is folded up and is placed in the stern end of a seine-boat. The purse-weights are also placed in the said boat, and the ends of the purse-lines are connected to a pursing-machine, which is also in the seine-boat. One end of the net is thrown out and is picked up by a man in a dory nearby, who rows off with it. The purse-weights are thrown overboard whenever necessary or advantageous to counteract the effect of a strong running tide upon the net while the net is being pursed up.

The net is drawn around a school of mackeral or other fish in the usual manner, and all three purse-lines are then drawn upon simultaneously, so that all the fish are caught and are forced into the trap. In drawing upon the three purse-lines the auxiliary purse-line causes the middle part of the bottom edge of the net to be drawn in first, so that no fish can escape at that point, as in seine-nets heretofore constructed.

What I claim is—

In a seine-net, the combination, with a net having guides along its bottom and side edges, of two main purse-lines E secured to the top corners of the said net and slidable in the said guides and secured together at the middle of the bottom of the net, and an auxiliary purse-line F secured to the free end portions of the said main purse-lines and secured to the middle portion of the bottom of the net between the said main purse-lines, substantially as set forth.

In testimony whereof I affix my signature in presence of two witnesses.

ALBERT E. BUTLER.

Witnesses:
 ALICE J. MURRAY,
 FREDK. K. DAGGETT.